United States Patent [19]
Ho

[11] Patent Number: 5,669,616
[45] Date of Patent: Sep. 23, 1997

[54] TOOL CHUCK

[76] Inventor: Lin Yuan Ho, No.210,Lane 388,Dou-One W.Rd, Yung-Feng Village,Pi-Tou Hsiang, Chang-Far Hsien, Taiwan

[21] Appl. No.: 556,353

[22] Filed: Nov. 13, 1995

[51] Int. Cl.$^6$ ................................................. B23B 13/12
[52] U.S. Cl. ................................................. 279/62; 279/902
[58] Field of Search .................................. 279/60–65, 902

[56] References Cited

U.S. PATENT DOCUMENTS

| 1,775,994 | 9/1930 | Emrick ................................. 279/60 |
| 5,438,318 | 8/1995 | Steadings et al. ..................... 279/62 |

FOREIGN PATENT DOCUMENTS 583004  12/1946  United Kingdom ...................... 279/60

*Primary Examiner*—Steven C. Bishop
*Attorney, Agent, or Firm*—W. Wayne Liauh

[57] ABSTRACT

An improved key-less tool chuck is disclosed. It includes: (a) a main body having a plurality of oblique guidances spaced intermittently at equal angles centering around a central axis, and a rear stopper; (b) a plurality of jaws slidably and respectively mounted in the guidances, each of the jaws having a gear rack, which is slanted relative to the central axis; (c) an integrated rotational nut having a rotational ring, a back ring and a plurality of balls, the rotational nut is mounted in front of the rear stopper and the rotational ring is rotatable about the central axis via the balls, which serve as a bearing; (d) the rotational ring having a slanted inner ring surface having matching slope and internal thread for engaging with the gear racks of the jaws so as to drive the jaws closer together when it is rotated in one direction, and drive the jaws apart from each other when it is rotated in another direction; (e) a front stopper element fixedly mounted on the main body in front of the rotational nut for forcing the rotational nut against the rear stopper; and (f) a front jacket rotatably mounted on the main body and is in movable engagement with the rotation ring for driving the rotational ring to rotate.

7 Claims, 6 Drawing Sheets

TOOL CHUCK

BACKGROUND OF THE INVENTION

The present invention relates to an improvement of tool chucks, and particularly to a key-less tool chuck that can be used manually by hand for tightening or releasing the chuck.

It is common knowledge for electric or pneumatic tool mounting screwdrivers, nutdrivers, drillers, grinding stones or other processing tools for processing workpieces. However, the shanks of various processing tools have different diameters or are of different shapes so that conventional arts have developed a variety of chucks with a wider range of adjustments for chucking tools of various shapes.

One of the conventional arts has developed a three-jaw gear chuck. This conventional chuck body includes three jaws inclining by 120 degrees on the circumference at interval for engaging with a threading cone by means of a nut whereby each jaw may turn along the threads in the nut for extending or retreating, sliding obliquely. The nut is controlled by the wrench of an umbrella gear on the chuck for chucking or releasing the workpiece.

In addition, recently there have been a number of key-less chucks on the market. The key-less chuck uses ball bearings to reduce frictional force of the nut whereby the operator may manually turn the jacket of the chuck for tightening the jaws. A major defect of the key-less chuck lies in the large number of parts and the difficulty in the assembly of the ball bearings, resulting in manufacturing problems.

In view of this, the inventor has been engaged in research and development based on the experience of developments in related products over the years and finally has developed the present invention through continuous tests and improvements.

SUMMARY OF THE INVENTION

One object of the invention is to provide a tool chuck for reducing frictional force of elements and increasing tightening torsion.

Another object of the invention is to provide a tool chuck consisting of a fewer number of parts to make assembling easy.

Still another object of the invention is to provide a tool chuck with accurate positioning of jaws and high precision of operation.

These and other objects and advantages of the present invention will become apparent to those skilled in art after considering the following detailed specification together with the accompanying drawings.

DETAILED DESCRIPTION OF PREFERRED EMBODIMENT

Figure 1:
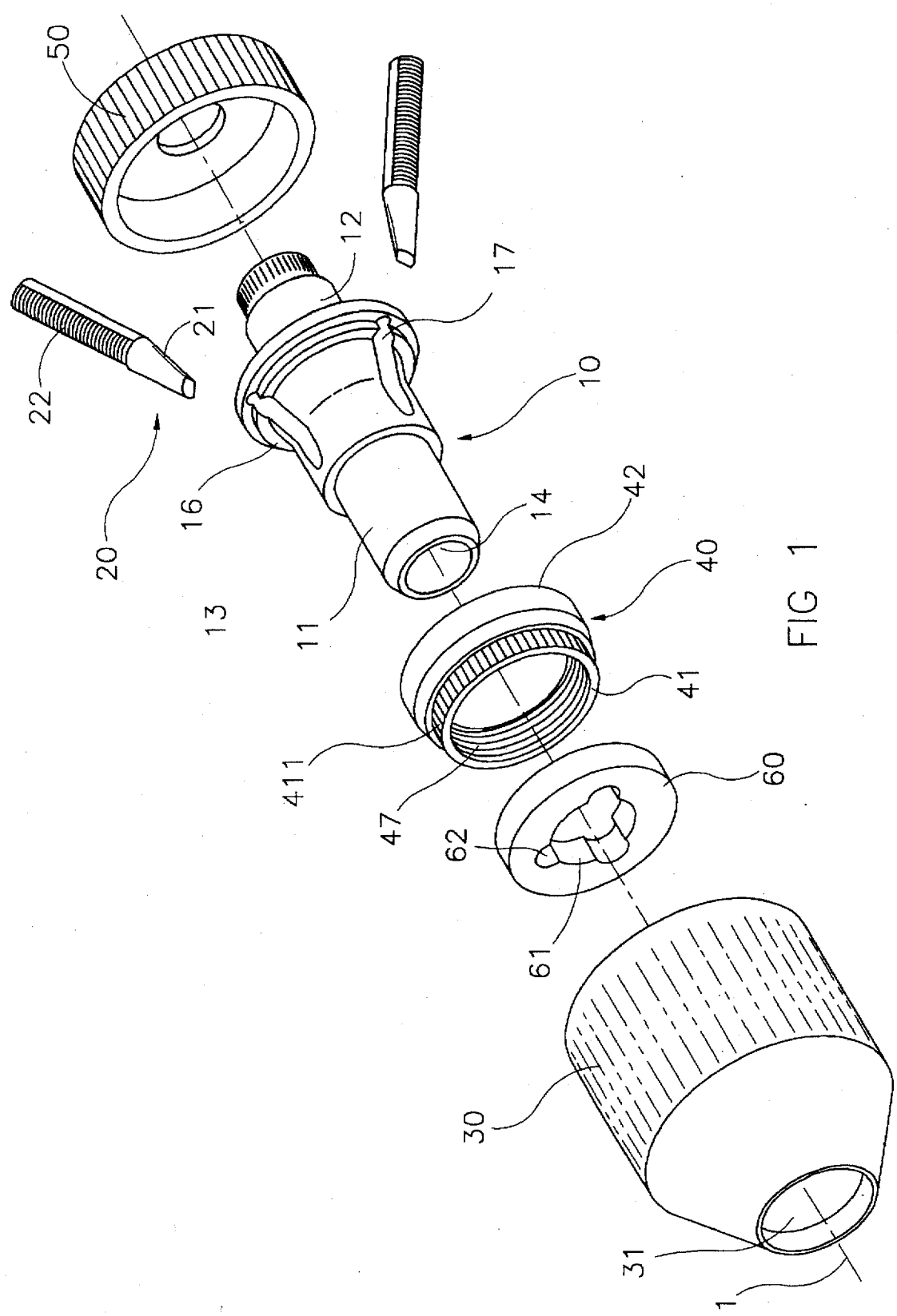
FIG. 1 is an exploded view of the present invention.

Referring to FIG. 1, the tool chuck comprises a main body 10, a plurality of jaws 20 in the main body 10, a from jacket 30 rotatably mounted on the main body 10, a rotational nut 40 for driving the jaws 20, and a rear sleeve 50. The chuck may be mounted on the drive shaft of electric or pneumatic tools for driving the jaws 20 to chuck tool shanks by means of rotating the front jacket so as to process the workpieces.

Figure 2:
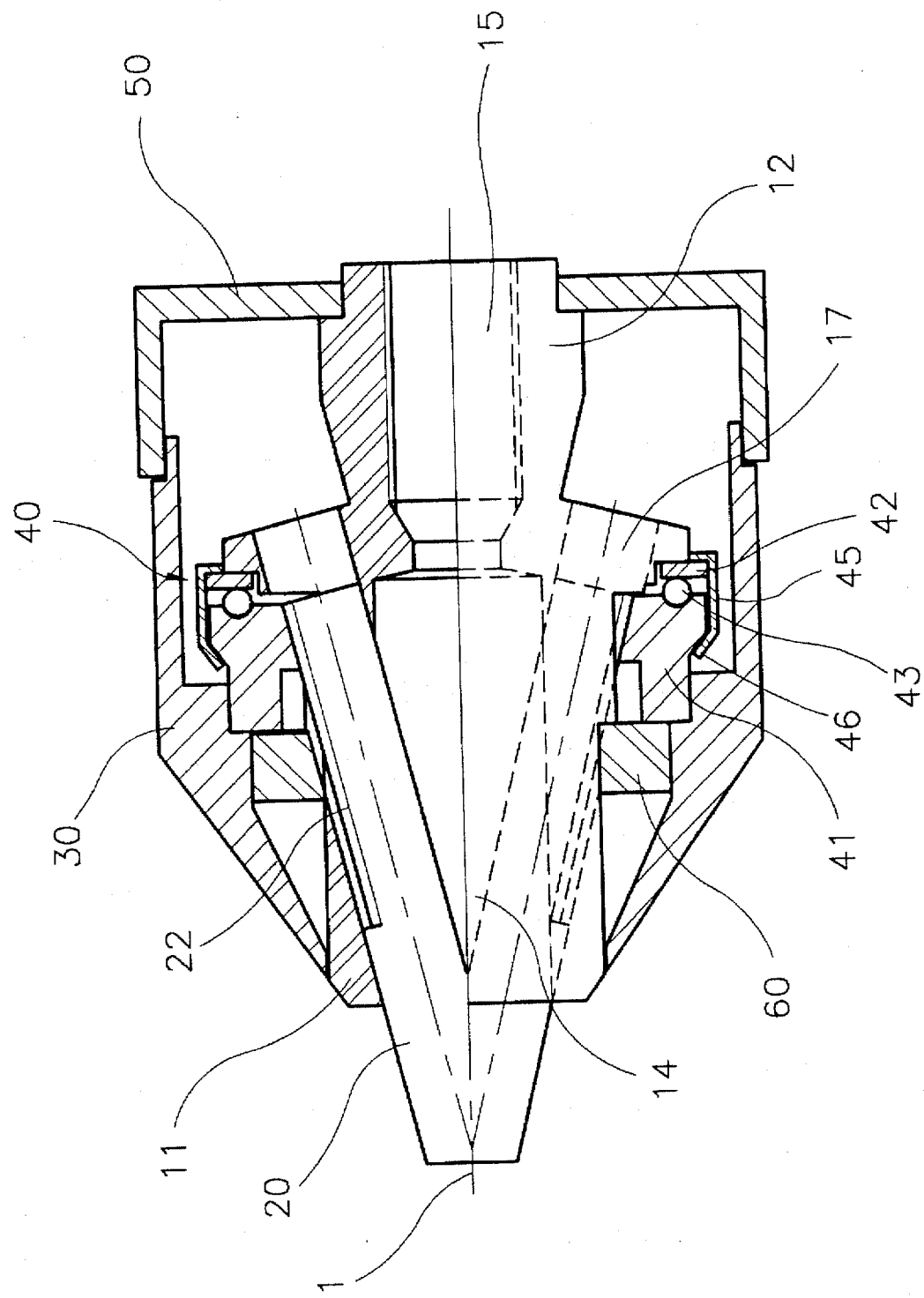
FIG. 2 is a partially-exploded view showing the internal structure of the chuck.

Referring to FIGS. 1 and 2, the main body 10 resembles a column shape, including a front section 11 and rear section 12. The front section 11 of the main body 10 has an axial hole 14 on the central portion thereof. The axial hole 14 has a bore dimensioned to receive maximum tool shanks roughly greater than the chuck 10. The rear section 12 of the main body 10 has an inner hole 15. The inner hole 15 may match the rotational shaft of the electric or pneumatic tool (not shown) while mounting the main body on the center axial line 1 of the rotational shaft for rotation accordingly.

The axial hole 14 and inner hole 15 are located on the center axial line 1 and communicate with each other. Between the front section 11 and rear section 12 of the main body 10 is a stopper 16 extending outwardly, allowing for the rotational nut and other members to set between the front section 11 and stopper 16 (to be described later).

The main body 10 has a plurality of oblique guidances 17 for mounting the jaws 20. Because most tool chucks use three jaws, the embodiment therefore has three oblique guidances 18 on the main body 10. Each oblique guidance 17 is arranged at an equi-angle intermittently centering around the center axial line 1 on the main body 10 and obliquely extending from the outer wall of the rear section of the main body 10 to the inside wall of the axial hole 14 on the front section 11 of the main body 10. Whereby it may receive the jaw 20 to allow each jaw 20 to slide forward in the oblique guidance 17 to cooperate with each other and therefore cause convergence of the chucking side 21 on the front end of each jaw toward the the center axial line 1, and to disengage each other when the jaw 20 slides backward.

A part of the intermediate section of the oblique guidance 18 extends through the outer surface of the main body 10 to allow the jaw 20 to match with the rotational nut 40 (to be described later) and to be driven for sliding along the oblique guidance 17.

The jaw 20 has a chucking side 21 on the front section to match for chucking up a tool shank (such as driller shank or screwdriver shank) toward the center axial line 1. In addition, each jaw 20 has a gear rack 22 on the external side relative to the main body 10. When each jaw 20 is received in the oblique guidance 17, the external side of each jaw, having the rack 22, may be exposed to the outer surface of the main body as a result of the oblique guidance 17 extending through the outer surface of the main body 10.

Referring to FIGS. 1 through 4, the rotational nut 40 has a rotational ring 41, a back ring 42, and a plurality of balls 43 mounted between the rotational ring 41 and back ring 42. Referring to FIG. 2, the back ring 42 is set on the main body 41 for leaning in front of the stopper 16, and the rotational ring 41 is mounted on the front position of the stopper 16 by means of the back ring 42 and the balls 43 in the form of a bearing.

The rotational ring 41 may turn around the center axial line 1, and the inner ring side thereof has an inner thread 47 for engaging the part of rack 22 of each jaw exposed to the main body 10 with the rack 22 of each jaw 20. In other words, FIG. 2 shows that the inner thread 47 is tilted, matching the slope of the gear rack 22. The shape of rack 22 of the jaw 20 is an outer thread to match the inner thread 47 of the inner ring side of the rotational ring 41 to split up along the circumference whereby the rack 22 may engage with the inner thread 47 on the inner ring side of the rotational ring 41 and therefore may drive the jaws 20 to slide in linear manner along the oblique guidance 17 when the rotational ring 41 is caused to be in rotation.

Figure 3:
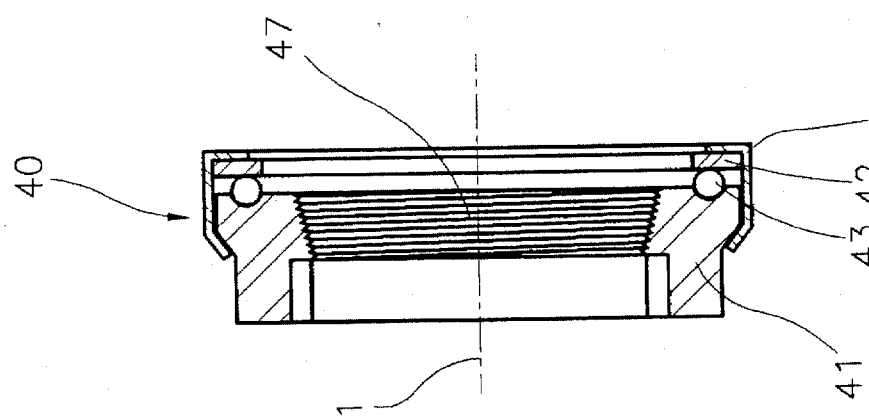
FIG. 3 is a longitudinally-exploded view of the nut in rotation, showing the internal structure of the present invention.

The major characteristics of the rotational nut of the present invention lie in an integral component of the conventional key-less chuck-driving nut with ball bearing to provide easy assembly and to reduce the number of required parts. Referring to FIG. 3, in the rotational nut 40, the rear end on the outside wall of the rotational ring 41 has an outer-projection rib 44. The outside of the back ring 42 is covered with an engaging element 45 for enabling the rotational ring 41 and the back ring 42 to connect together by relative rotation, and the outer rim of the engaging element 45 extends forward with the outside wall covering the rotational ring 41 to fasten the engaging portion 46 of the rib 44. The rear end of the outer edge inwardly extends with a fastening portion 48 on the back of the back ring 42, enabling the rotational ring 41, back ring 42 and balls 43 to integrate as an integrated element. This integrated design is made possible by designing the rotational ring 41 such that its inner thread 47 is tilted matching the slope of the gear rack 22, as shown in FIGS. 2 and 6.

Figure 5:
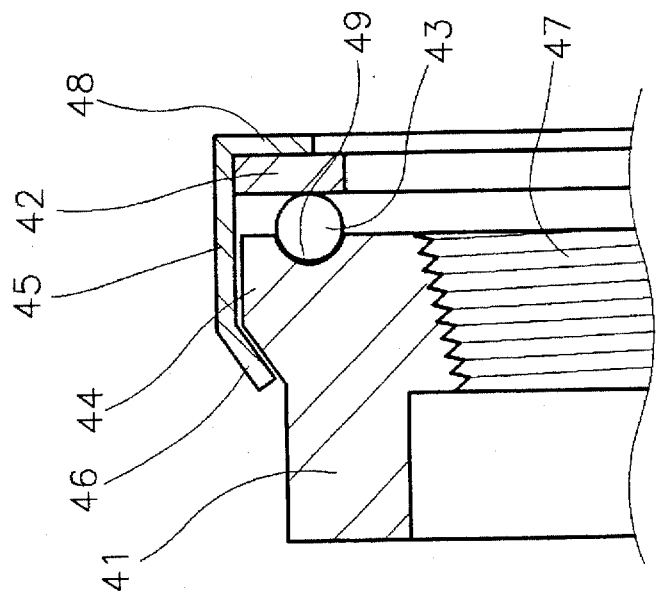
FIG. 5 is a partially enlarged-exploded view of the rotational nut, showing the match of the rotational ring, ball bearing, and back ring.
Figure 4:
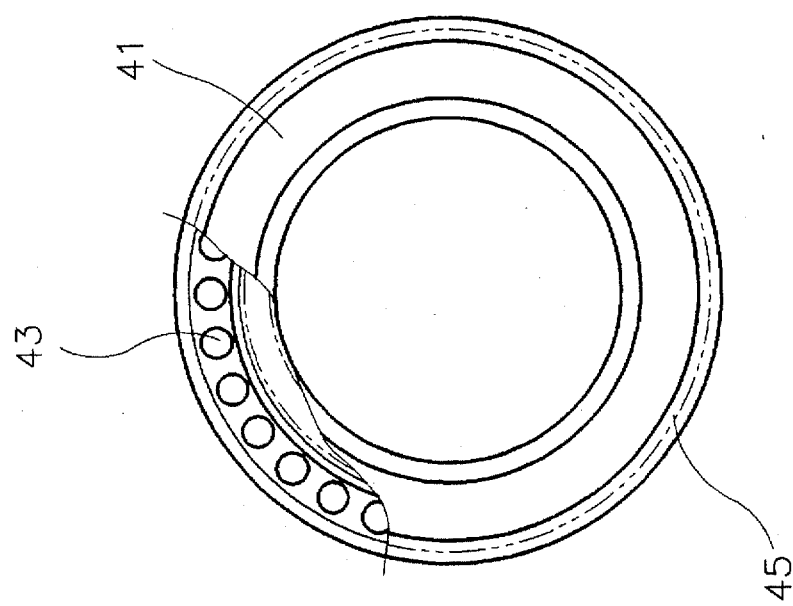
FIG. 4 is a front view of the rotational nut of the present invention.
Figure 7:
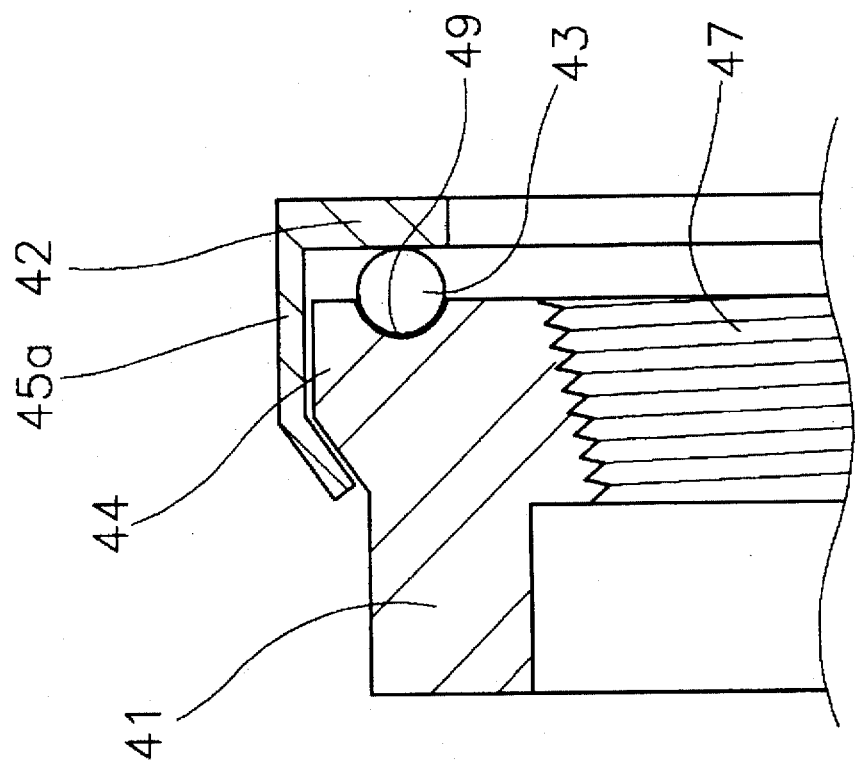
FIG. 7 is an enlarged view of another change of the rotational nut of the present invention.

Referring to FIG. 5, the rear side of the rotational ring 41 and contact end face of the balls 43 have a circular center around the center axial line 1 and may receive balls in the ball rail 49 for guiding the rolling direction of the balls 43. In another embodiment, referring to FIG. 7, the engaging element 45 can be replaced by engaging element 45a extending sidewise from the back ring 42 for fastening the rib 44 so as to accomplish the same purpose.

The front section 11 of the main body 10 is still fixedly set with a stopper 60 for locating the rotational nut 40, enabling it to keep it leaning in front of the stopper 16. On the center of the stopper 60 is an inner hole 61. The inside diameter of the inner hole 61 is slightly smaller than the outside diameter of the front section 11 of the main body 10 so that the stopper 61 may be tightly mounted on the front section 11. To prevent the stopper 61 from interfering with the jaws 20, the perimeter of the inner hole 61 to contact with the jaws has a proper number of grooves 62.

Figure 6:
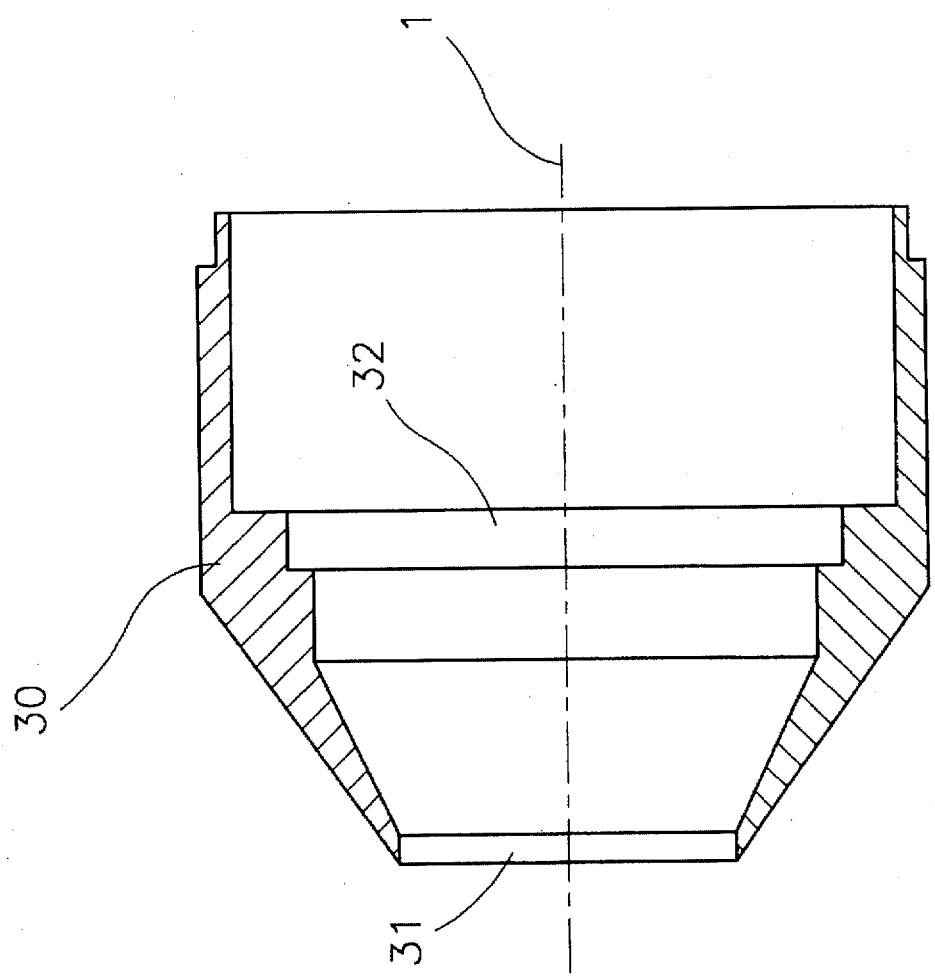
FIG. 6 is an exploded view of the front jacket of the present invention.

Referring to FIGS. 2 and 6, in front of the jacket 30 is a hole 31 slightly larger than the diameter of the front section of the main body 10. The inside diameter of the rear section is larger than the diameter of the main body 10, jaw 20, and rotational nut 40 so as to be able to receive these elements therein, and its outer surface may be carved with a pattern for the convenience of the operator to hold for turning the jacket 30.

On the inner wall of the jacket 30 is an internal ring side 32, and the diameter of the internal ring side 32 is slightly smaller than the diameter of the outside wall on the from section of the rotational ring 41 for tightly setting on the front section of the rotational ring 41. Referring to FIG. 1, the outside wall of the front section of the rotational ring 41 has a plurality of longitudinal patterns 41, enabling the rotational ring to set together with the jacket 30 tightly, allowing no relative rotation.

Figure 9:
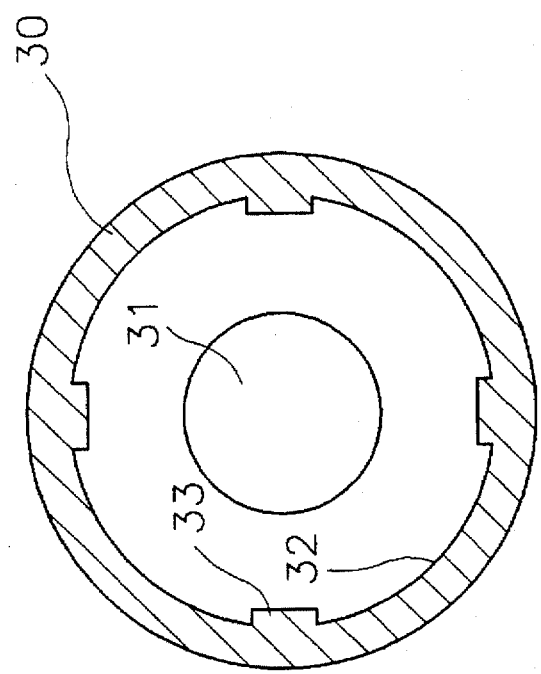
FIG. 9 is an exploded view of the jacket to match the rotational nut shown in FIG. 8.
Figure 8:
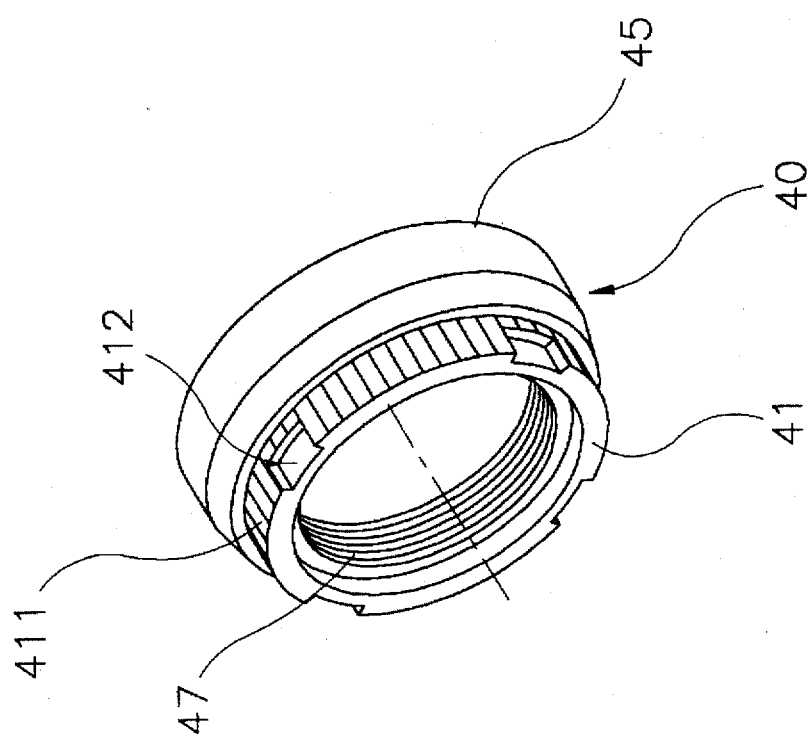
FIG. 8 is an elevational view of the embodiment with keyway mounted on the rotational nut.

Referring to FIG. 8, in order to enable the jacket 30 more secure to integrate with the rotational ring 41, a plurality of longitudinal key slots 412 may be mounted to set the front part on the external side of the rotational nut 41 with the inner ring side 32 of the jacket 30. Referring to FIG. 9, on the inner ring side 32 of the jacket 30 is a plurality of keys 33 to fit together with the key slots 412, and the jacket 30 may fit together with the key slots 412 on the rotational ring 41 by means of the keys 33, enabling both to set together more securely and not be liable to damage due to external forces.

The jacket 30 is setting with the rotational ring 41 by means of the inner ring side 32, enabling the jacket 30 to mount on the rotational ring 41 securely and to rotate following the rotation of the rotational ring 41.

When the operator holds the jacket 30 for turning it toward the locking direction, the rotational ring 41 may be driven to force the jaws 20 to extend forward to get close to one another and therefore to chuck the tool shank. When the jacket 30 is turning toward the direction of release, the rotational ring 41 may drive the jaws 20 to move backward while releasing the tool shank that has been chucked.

When the operator turns the jacket 30 to lock the tool shank, the jaws 20 extend forward to tightly hold the tool shank. The counteraction force may cause the rotational ring 41 to tightly hold the back ring 42. Because of the balls 43 mounted between the back ring 42 and the rotational ring 41, frictional force applied to the rotational ring 41 will be minimized, enabling the loss of locking force applied by the operator to the rotational ring 41 to be mimed. The internal thread 47 of the rotational ring 41 and the rack 21 on the jaws 20 adopt the design of a small pitch so as to produce very large mechanical benefits and therefore the users may lock up the tool shank by hand.

The major advantage of the methods for fixing the rotational nut 41 and the jacket 30 lies in the accuracy of location of the rotational nut 40 and therefore increasing the locating accuracy of the jaws 20.

The sleeve 50 is to match the rear section 12 of the main body 10 by means of press fit. When the main body 10 is desired for locking or releasing on the drive shaft of the electric or pneumatic tool, the sleeve 50 may be held for locking or releasing the main body 10 on the drive shaft.

It is preferred that the jaws 20 are identical to each other so that they may be exchanged with one another. In the conventional three-jaw gear chuck, the compensation thread and the pitch of thread are in proportion, whereby when the jaws contact one another, they will converge on the center axial line 1. To enable the three jaws to be the same, it may cause some eccentricity. The present invention adopts the thread that has a finer pitch to minimize its eccentricity. Upon assembly of the chuck, it may use grinding for the jaws of the chuck so as to eliminate eccentricity resulting from the three jaws so that the shaft center of the chuck is the same as the shaft center of the three jaws.

What is claimed is:

1. A tool chuck including:
   (a) a main body having a plurality of oblique guidances spaced intermittently at equal angles centering around a central axis of said main body, and a rear stopper;
   (b) a plurality of jaws slidably and respectively mounted in said guidances, each of said jaws having a gear rack, which is slanted relative to said central axis;

(c) an integrated rotational nut having a rotational ring, a back ring and a plurality of balls, said rotational nut is mounted in front of said rear stopper and said rotational ring is rotatably mounted about said central axis via said balls, which serve as a bearing;

(d) said rotational ring having a slanted inner ring surface having matching slope and internal thread for engaging with gear racks of said jaws so as to drive said jaws closer together when it is rotated in one direction, and drive said jaws apart from each other when it is rotated in another direction;

(e) a front stopper element fixedly mounted on said main body in front of said rotational nut for forcing said rotational nut against said rear stopper; and (f) a front jacket rotatably mounted on said main body and is in movable engagement with said rotation ring for driving said rotational ring to rotate.

2. The tool chuck as claimed in claim 1 which further includes:

(a) a rib extending outwardly to a rear section on an outer edge of said rotational ring; and (b) an engaging element mounted outside said back ring and having an engaging portion extending to cover said rib enabling said back ring and said rotational ring to be close together by means of a relative rotation.

3. The tool chuck as claimed in claim 2 wherein said engaging element is integrally molded with said back ring.

4. The tool chuck as claimed in claim 1 wherein said rotational ring is provided with a ball rail on a rear end surface thereof for receiving said balls and allowing said balls to roll therewithin.

5. The tool chuck as claimed in claim 1 wherein said rotational ring has a plurality of longitudinal patterns.

6. The tool chuck as claimed in claim 1 wherein said rotational ring has a plurality of key slots on a front section thereof and a plurality of longitudinal patterns on a rear section thereof.

7. The tool chuck as claimed in claim 1 wherein said front jacket has a plurality of keys formed on an inner wall thereof.

* * * * *